United States Patent [19]
Leslie et al.

[11] Patent Number: 6,097,807
[45] Date of Patent: Aug. 1, 2000

[54] SWITCHING SYSTEM

[75] Inventors: Ian Malcolm Leslie, Cambridge, United Kingdom; Jacobus Erasmus Van der Merwe, Summit, N.J.

[73] Assignee: cplane, Inc., Los Altos, Calif.

[21] Appl. No.: 09/242,371

[22] PCT Filed: Oct. 10, 1997

[86] PCT No.: PCT/GB97/02802

§ 371 Date: Feb. 12, 1999

§ 102(e) Date: Feb. 12, 1999

[87] PCT Pub. No.: WO98/17034

PCT Pub. Date: Apr. 23, 1998

[30] Foreign Application Priority Data

Oct. 11, 1996 [GB] United Kingdom ................... 9621248

[51] Int. Cl.[7] .................................................. H04M 3/00
[52] U.S. Cl. .......................... 379/269; 379/268; 379/242
[58] Field of Search ................................... 379/269, 268, 379/279, 242, 243, 244, 245, 246, 271, 270, 272

[56] References Cited

U.S. PATENT DOCUMENTS

| | | | |
|---|---|---|---|
| 5,239,539 | 8/1993 | Uchida et al. | 379/269 |
| 5,517,563 | 5/1996 | Norell | 379/269 |
| 5,546,452 | 8/1996 | Andrews et al. | 379/269 |
| 5,809,129 | 9/1998 | Andersson et al. | 379/220 |
| 5,822,422 | 10/1998 | Daase et al. | 379/269 |

FOREIGN PATENT DOCUMENTS 0 449 095  10/1991  European Pat. Off. .

OTHER PUBLICATIONS

Senoh et al.: "Multiprocessor Architecture For Large–Capacity ATM Switching System" ISS '95. World Telecommunications Congress. (International Switching Symposium), Advanced Switching Technologies For Universal Telecommunications At The Beginning Of The 21st Century Berlin, Apr. 23–28, 1995, vol. 1, Apr. 23, 1995, Verband Deutscher Elektrotechniker (VDE) ET AL, pp. 263–267.

Kamigaki et al.: "Broadband Switching System For Public Network" Fujitsu–Scientific And Technical Journal, vol. 32, No. 1, Jun. 1, 1996, pp. 3–12.

Jain et al: "An Evolvable ATM–Based Video Network Design Supporting Multiple Access Network Technologies", IEEE Communications Magazine, vol. 33, No. 11, Nov. 1, 1995, pp. 58–63.

Shabana et al.: "Intelligent Switch Architecture" Proceedings Of The National Communications Forum, vol. 42, No. 2, Sep. 30, 1998, pp. 1312–1320.

*Primary Examiner*—Krista Zele
*Assistant Examiner*—William J. Deane, Jr.
*Attorney, Agent, or Firm*—Chien-Wei Chris Chou; Oppenheimer Wolff & Donnelly LLP

[57] ABSTRACT

A switch (10) for controlling the switching of communication paths in communication equipment, such as telephone networks, is connected to a plurality of controllers (11, 12, 13) via a divider unit (14). The divider unit (14) divides some or all of the resources of the switch (10) into a plurality of switch resource sets, and those switch resource sets are then associated with respective ones of the controllers (11, 12, 13). This has the effect of enabling each switch resource set to act as an independent sub-switch, with each controller (11, 12, 13) then controlling a corresponding sub-switch. This division of the resources of the switch (10) allows different control architectures to be operated simultaneously. This permits different virtual networks to be constituted on the same physical network. Any one of the controllers (11, 12, 13) has access only to the switch resource set or sets allocated to that controller (11, 12, 13). The controllers (11, 12, 13) are connected to the divider unit (14) by corresponding divider control interfaces (16, 17, 18) and the divider unit (14) is connected to the switch (10) by a switch control interface (15).

13 Claims, 1 Drawing Sheet

SWITCHING SYSTEM

REFERENCE TO RELATED APPLICATIONS

This application claims the benefit of PCT application with International Application Number PCT/GB97/02802, filed Oct. 10, 1997, which claims the benefit of United Kingdom patent application number 9621248.5, filed Oct. 11, 1996.

BACKGROUND OF THE INVENTION

The present invention relates to a system for controlling the switching of communication paths in communication equipment. The present invention is particularly advantageous for use in connection orientated communication networks, such as telephone networks, or asynchronous transfer mode (ATM) networks. However, the present invention may also find application in other switching situations such as the controlling of data paths in connectionless computer networks

SUMMARY OF THE PRIOR ART

Connection orientated networks carry two distinct types of information. These are generally known as the control path and the data path, but the terms control plane and user plane are also sometimes used. In a telephone network as an example of a connection orientated network, the control path is responsible for the establishment and clearing of calls (also referred to as a signalling), fault reporting, for billing, and for the control of special features such as call forwarding and the use of special numbers. The data path is the speech, facsimile, or other information conveyed by the call. Connection orientated communications networks, such as telephone or ATM networks, need to provide a clear distinction between these types of communication. A set of protocols, interfaces and procedures are defined by the creator of the network, and are used by the network to implement all control functions of the network, including signalling and network management. That set will be referred to herein as the control architecture of the network.

At various locations around the network there are physical switches which permit information in the data path of the network to be routed appropriately. The control architecture then controls the operation of those switches to achieve the desired operations. In many networks, the control architecture is implemented directly on the physical switches of the network. However, schemes for separating the control function of the control architecture from the physical switches have been proposed. Such arrangements require an interface between the control unit which carries out the control functions and the physical switch. Such an interface can be private or public; a private interface is defined entirely by the creator of the switch, whereas a public interface allows the user of the network to purchase physical switches and then apply their own control architecture when building the network.

In general, each switch carries out switching between multiple input/output ports. Those ports are normally bi-directional, so that the port which acts as an input for one item of information at a particular time may act as an output at a different time.

With such switch, it is possible to define the "resources" of the switch. Those resources include the logical address space of each port. In an ATM network, examples of such logical address space includes virtual channel address space and virtual path address space. In addition, the resources may include the transmission capacities of each port, the buffers within the switch, and control operations known in ATM as traffic shapers and traffic policers.

In the known arrangements, each physical switch has a single controller which controls the actions of the switch. Thus, the switch can operate only on the basis of one control architecture. Furthermore, since only a single control architecture is operational, this control architecture is normally general purpose in nature, because it has to cater for the requirements of any application or set of applications.

The controller may run on a single processor or may be distributed across a plurality processors. In the latter case the individual parts of the controller will intercommunicate to ensure co-ordinated behavior.

SUMMARY OF THE INVENTION

The present invention proposes that a plurality of controllers are connectable to each physical switch. Their connections are via a divider unit which divides some or all of the switch resources into a plurality of switch resource sets. The division of resources may be arbitrary, and in particular is not limited to dividing the switch into sets of ports. Each switch resource set may then act as an independent sub-switch or "switchlet". This allows different control architectures to be operational simultaneously. These different operational control architectures and the associated switch resource set then constitute different virtual networks on the same physical network. A development of the present invention then permits the use of service specific control architectures on some of these virtual networks As mentioned above, the present invention allows different control architectures to be operational simultaneously. Of course, the handling of different items of information by the switch is necessarily time-divided, but the control architecture, being the set of protocols, interfaces and procedures referred to above, can be considered a relatively long-term effect and thus multiple protocols may be considered to be present simultaneously even when the timing of the routing of individual items of information is time-divided.

Note that the present invention is not limited to switches involving bi-directional ports mentioned previously. Moreover, it is possible for a switch to have only one input or output port at any particular time.

It should be noted that many physical switches have a processor, or a plurality of processors, in which the divider unit may be implemented. Thus, although the switch and the divider unit may be considered functionally separate, they may be physically integrated.

As mentioned above, the present invention divides some or all of the switch resources into switch resouce sets. In practice, in order for the present invention to operate satisfactorily, it will normally be necessary to divide at least the logical address space of the ports, but any or all of the other factors which determine the switch resources may also be divided.

The division of the switch can be done statically whereby the divider unit is statically configured to divide the switch between a predetermined number of controllers, each potentially presenting a different control architecture. However, this is not essential and it is possible for the controller to signal to the divider unit that the controller requires to control part of the switch. The divider unit can then dynamically reconfigure the physical switch division to accommodate the requesting controller.

With the present invention, any particular controller has only access to the switch resource set or sets allocated to them. Thus, the present invention includes the possibility that there is only a single controller connected via the divider unit to the switch. The arrangement would then have the advantage that additional controllers could subsequently be connected to that switch by appropriate re-configuration of the divider unit. Thus at any moment in time, several controllers will be logically in control of the same physical switch, however their control actions will be restricted to a set of the switch resources which is a sub-set of the full resources of the switch.

The present invention thus permits a switch to operate according to different control architectures at the same time. The control architectures used by each controller may be any of the known ones, but the present invention also permits new control architecture to be added to the network merely by connection of a controller operating according to that control architecture. This permits not only the ability to run a plurality of control architectures on the same network, but also the ability to change from one control architecture to another rapidly. It thus provides a useful way of testing experimental control architectures without having to configure the network entirely to that experimental architecture. The network may run according to known and established control architectures on a subset of network resources with the experimental architecture operating on a different subset of the resources.

A further possibility is that the controllers implement the same control architecture. The effect of the partitioning of the switch resources by the divider unit is then to divide the network into a plurality of virtual networks with different instances of the same control architecture.

A further possibility is to have service specific control architectures, which are built to satisfy the requirements of a particular application or set of applications. By utilising knowledge of the applications it serves, such a service specific control architecture can be more efficient than a generic control architecture, and can also make better use of potentially scarce network resources. One example of a service specific control architecture would be one that provides services to a video conferencing application. In this case knowledge of the pattern of participation and where participants are located can be used to minimise the bandwidth required from the network.

BRIEF DESCRIPTION OF THE DRAWINGS

Embodiments of the present invention will now be described in detail, by way of example, with reference to the accompanying drawing, in which.

DETAILED DESCRIPTION

Figure 1:
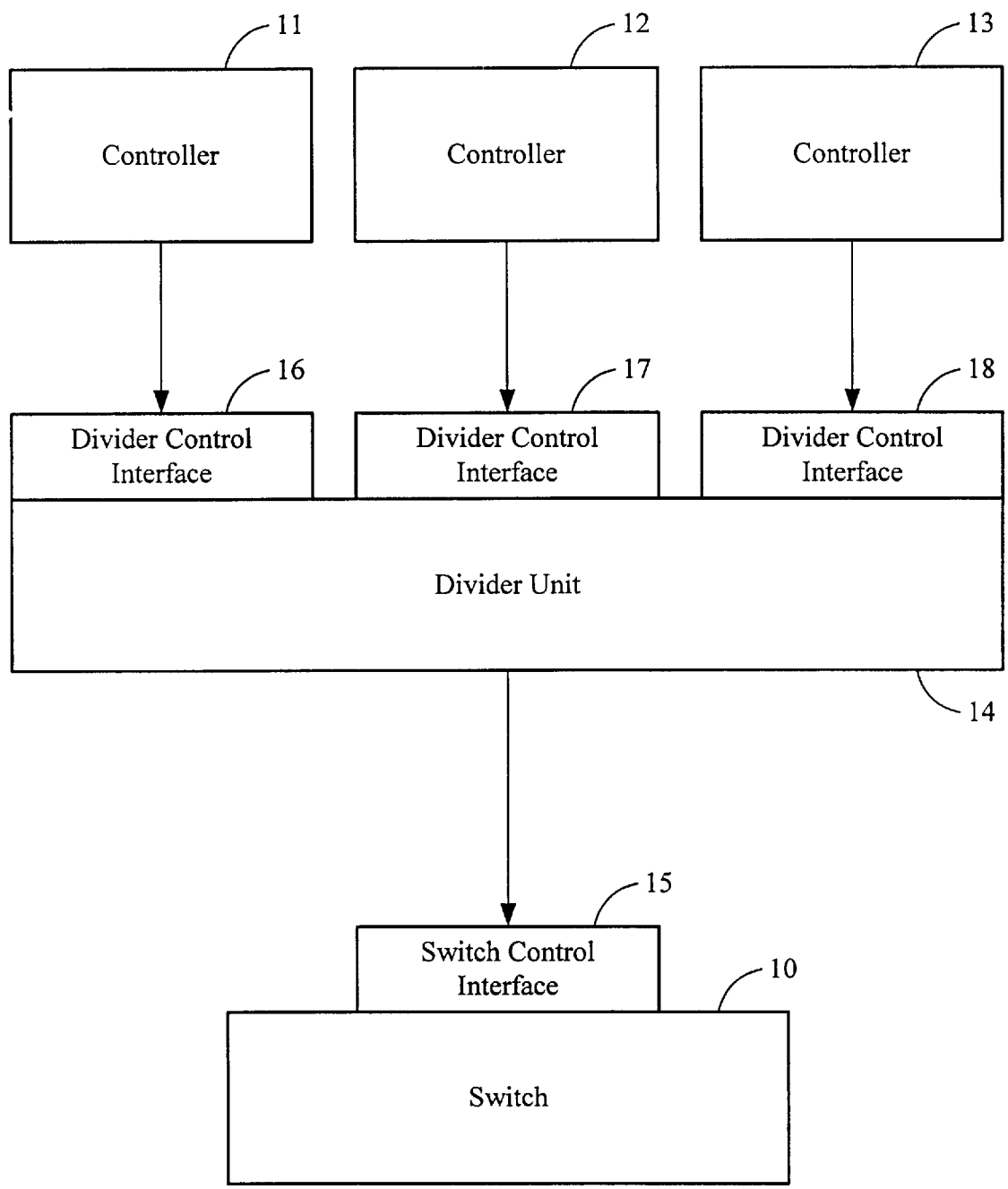
FIG. 1 is a schematic view of a switching arrangement embodying the principles of the present invention.

The basic principles of operation of an embodiment of the present invention will first be discussed with reference to FIG. 1. In FIG. 1, a switch 10 controls the routing of information in the data path of a network (not shown) to which the switch 10 is connected at some suitable point. The switch 10 is connected to a plurality of controllers 11, 12, 13 via a divider unit 14. The divider unit 14 allocates the resources of switch 10 among the controllers 11, 12, 13 according to suitable division rules determined by the divider unit 14. Thus at any moment in time, any of the controllers 11, 12 and 13 can invoke control operations on the switch to influence the way data path information will be routed. These invocations are made through divider control interfaces 16, 17 and 18 exported by the divider unit 14. In this way all such invocations will be intercepted by the divider unit 14, which will ensure that the invocation will only influence the set of switch resources allocated to the controller making the invocation, before passing the request on to the switch. The request is passed to the switch by means of a switch control interface 15 which is exported by the switch 10. If the divider unit 14 finds that the request by the controller relates to resources not allocated to it, the request will fail and will not be passed on to the switch. Thus at any particular moment in time, some data path information will be routed according to control from controller 11, others according to control from controller 12, and yet others according to control from controller 13. Within the switch 10 these different sets of data path information will likewise use resources allocated to the different controllers 11, 12, 13 by the divider unit 14.

The controllers 11, 12, 13, the divider control interfaces 16, 17 and 18, the divider unit 14 and the switch control interface 15 are logical structures, and the physical components needed to perform those structures may be any suitable hardware or software. For example, the controllers 11, 12, 13 and the divider unit 14 may be part of a common workstation, which is connected to the switch 10 via a physical connection (not shown). By means of this physical connection, the switch control interface 15, which is a control function of the switch 10, is accessed. It would also be possible for the controllers 11, 12, 13, the divider control interfaces 16, 17, 18, the divider unit 14 and the interface unit 15 to be an integral part of the switch 10. Any other combination between these two extremes is also possible.

A specific embodiment of the arrangement shown in FIG. 1 will now be described in more detail. In that embodiment, a Fore System ASX-100 switch, is connected to several HP-700 series workstations equipped with Fore Systems EISA-200 ATM adapters. The ASX-100 switch is used in this embodiment because low level information of the switch is available which enables the implementation of the present invention without difficulty. The distributed processing environment (DPE) used in this embodiment is an implementation of the distributed interactive multi-media architecture (DIMMA) disclosed by Guangxing Li, in "DIMMA Nucleus Design", Tech. Rep. APM. 1551.00.05, APM Limited, Castle Park, Cambridge, UK 1995. The DIMMA architecture is an object request broker (ORB) framework, which provides a common base for the construction of domain specific brokers. The DIMMA architecture allows several protocol stacks to be operational.

The divider control interfaces 16, 17, 18, and the switch control interface 15 provide the same functionality, and are thus logically equivalent. The implementation of these interfaces may however be different.

Requests from the controllers 11, 12, 13 passing through the controller interfaces 16, 17, 18 are monitored by the divider unit 14 to ensure that requests relates only to resources allocated to the specific controller which issued the request. The requests are passed to the switch control interface 15 only if this is true.

Two possible divider controller interface 16, 17, 18 arrangements are:

i) A DIMMA based implementation, which provides several service interfaces with methods to enable switch control, and relies on the distributed processing environment (DPE) to sort out the format of messages.

ii) A server side implementation of the Generic Switch Management Protocol (GSMP) from Ipsilon described in more detail by P. Newman, W Edwards, R. Hunden, E.

Hoffman, F. Ching Liaw, T Lyon and G. Minshall, in "Ipsilon's General Switch Management Protocol Specification Version 1.1", Internet RFC1987, 1996. This is a message passing protocol with well defined message formats. Example implementations of the switch control interface 15 includes:

1. An arrangement using Simple Network Management Protocol (SNMP), to communicate with an SNMP server running on the switch 10 to perform control operations. SNMP is described in more detail by J. Case, M. Fedor, M. Schoffstall and J. Davin in "A Simple Network Management Protocol (SNMP)", Internet RFC1157. This approach has the advantage that switches often provide an SNMP server which means that no special server needs to be operational on the switch to enable use of the invention, and it therefore allows all switches with SNMP capabilities to be controlled. This implementation is not preferred, since it is believed to be slow.

2. A message passing protocol known as "LIGHT" which is similar in nature and functionality to Generic Switch Management Protocol (GSMP).

3. An implementation of the server side of GSMP on the switch 10. Communication is via a permanent virtual circuit (PVC).

4. A DIMMA based implementation which provides an interface identical to the DIMMA divider controller interface mentioned above.

5. It is also possible in some cases, for example with the ASX-100 switch, to implement the divider unit directly on the switch. In such an arrangement the switch control interface 15, is not exported, and instead the switch directly exports divider control interfaces 16, 17 and 18.

All the arrangements discussed above are equivalent in terms of functionality. Use of them, in this embodiment, permitted comparisons to be made as will be discussed below.

A simple test was performed to compare the different implementations discussed above. In all cases the relevant server was running on the ASX-100 switch, while the standalone version of the controller was running on an HP 9000/725 workstation running HPUX version A.09.05, which was connected to the switch 10 by means of a Fore Systems EISA-200 ATM adapter.

The test involved the controller requesting the necessary configuration from the server, followed by 1000 timed invocations. Each pair of timed invocations involved creating and deleting a Virtual Circuit (VC) in the switch. Since all servers on the switch shared the same library interfacing with the low level switch hardware, this test is essentially an evaluation of the efficiency of the communication channel used, as well as the efficiency of different server implementations.

For comparison purposes the time taken for a null DIMMA remote procedure call (RPC) between the same two platforms was measured to be 3.8 ms. The results for the arrangements are as follows (note that these results are for two invocations rather than one as in the case of null RPC).

LIGHT: 4.5 ms per invocation pair
GSMP: 8.9 ms per invocation pair
Use of DIMMA server implemented on the switch 10 8.3 ms per invocation pair.
Implementing the embodiment of the divider unit on the switch 10 itself 8.3 ms per invocation pair.

A number of tests were performed on the embodiment to evaluate the effect of the insertion of the divider unit 14 in the control path. Again, the average time for a 1000 VC create and delete pairs was measured.

In one test, the divider unit 14 was implemented on the physical switch, with the controller being in an HP workstation directly connected to the switch 10. The average time for an invocation pair was 8.3 ms.

In another arrangement, the divider unit 14 was incorporated into the workstation with a LIGHT arrangement on the switch. The average for an invocation pair was 10.4 ms.

This test was then repeated, but with a controller running on a different HP workstation next to the same switch. The average for an invocation pair was found to be 10.1 ms.

Finally, the test was repeated but with the divider unit 14 exporting a GSMP interface with a GSMP controller on the second workstation. The average time for an invocation pair was 7.7 ms.

These tests establish that the separation of the control functions carried out by the controllers 11, 12, 13 and the switch 10 by the divider until 14 is not expensive, and does not present high overheads in the control path to the switch.

They also establish that the present invention is achievable using conventional control architectures, although, as mentioned above, the present invention permits any controller, and corresponding control architecture, to be connected to the switch 10 via the divider unit 14.

What is claimed is:

1. A switch apparatus for controlling the switching of communication paths in communications equipment, comprising:

a switch having a plurality of input/output ports;

a divider unit operatively connected to said switch; and a plurality of independent controllers connectable to said switch via said divider unit, each of said controllers being arranged to invoke control operations on the switch;

said divider unit being arranged to divide some or all of the resources of said switch into a plurality of switch resource sets, and to associate at least some of said switch resource sets with respective said controllers;

said divider unit being further arranged to check the invocations made by each of said controllers, whereby each of said controllers is able to invoke only such control operations as conform to the resources of the resource set(s) associated with the respective controller.

2. A switch apparatus according to claim 1, wherein said divider is arranged to divide the logical address space of at least some of said input/output ports of said switch in said dividing of said some or all of said resources of said switch.

3. A switch apparatus according to claim 1 or 2, wherein each of said plurality of switch resource sets has an associated controller, and wherein at least one of said controllers operates according to a control architecture which differs from a control architecture according to which at least one of the others of said controllers operates.

4. A switch apparatus according to claim 1 or 2, wherein each of said plurality of switch resource sets has an associated control architecture, and all of said controllers operate according to the same control architecture.

5. A communication network including a plurality of switch apparatuses, each switch apparatus being for controlling the switching paths at a point in said network, each switching apparatus comprising:

a switch having a plurality of input/output ports;

a divider unit operatively connected to said switch; and a plurality of independent controllers connectable to said switch via said divider unit, each of said controllers being arranged to invoke control operations on the switch;

said divider unit being arranged to divide some or all of the resources of said switch into a plurality of switch resource sets, and associating at least some of said switch resource sets with respective said controllers;

said divider unit being further arranged to check the invocations made by each of said controllers, whereby each of said controllers is able to invoke only such control operations as conform to the resources of the resource set(s) associated with the respective controller.

6. A method of controlling the switching of communication paths in combination equipment using a switching apparatus, the switching apparatus comprising a switch having a plurality of input/output ports;

a divider unit operatively connected to said switch; and a plurality of independent controllers connectable to said switch via said divider unit, each of said controllers being arranged to invoke control operations on the switch;

the method comprising dividing some or all of the resources of said switch into a plurality of switch resource sets, associating at least some of said switch resource sets with respective ones of said controllers, checking the invocations made by each of said controllers, and ensuring each of said control operations is able to invoke only such control operations as conform to the resources associated with the respective controller, thereby to control the switching of communication paths on the basis of at least some of said switch resource sets associated with said respective said controllers.

7. A switch apparatus for controlling the switching of communication paths in communications equipment, comprising:

a switch having a plurality of input/output ports traversed by corresponding selected ones of the communication paths, said switch providing switch resources for interconnecting said corresponding selected ones of the communication paths;

a divider unit operatively connected to said switch; and a plurality of independent controllers coupled for communication with said switch via said divider unit, each of said controllers being operative to invoke control operations for controlling at least a portion of said switch resources;

said divider unit being operative to divide some or all of said switching resources into a plurality of switch resource sets, and to associate at least some of said switch resource sets with respective ones of said controllers;

said divider unit being further operative to check the invocations made by each of said controllers, such that each of said controllers is able to invoke only such control operations as conform to the resources of the resource sets associated with the respective controller.

8. A switch apparatus according to claim 7, wherein said divider is operative to divide logical address space associated with at least some of said input/output ports of said switch in said dividing of said some or all of said resources of said switch.

9. A switch apparatus according to claim 7 or claim 8, wherein each of said plurality of switch resource sets has an associated controller, and wherein at least one of said controllers operates according to a control architecture which differs from a control architecture according to which at least one of the others of said controllers operates.

10. A switch apparatus according to claim 7 or claim 8, wherein each of said plurality of switch resource sets has an associated controller, and wherein all of said controllers operate according to the same control architecture.

11. A communication network comprising:

a plurality of communication paths; and at least one switching device providing switching between corresponding selected ones of said paths at a corresponding point in the network, said switching device including, a switch having a plurality of input/output ports traversed by corresponding selected ones of the communication paths, said switch providing switch resources for interconnecting said corresponding selected ones of the communication paths, a divider unit operatively connected to said switch, and a plurality of independent controllers each being coupled for communication with said switch via said divider unit, each of said controllers being operative to invoke control operations for controlling at least a portion of said switch resources, said divider unit being operative to divide some or all of said switching resources into a plurality of switch resource sets, and to associate at least some of said switch resource sets with respective ones of said controllers, said divider unit being further operative to check the invocations made by each of said controllers, whereby each of said controllers is able to invoke only such control operations as conform to the resources of the resource set(s) associated with the respective controller.

12. A communication network according to claim 11 wherein at least one of said controllers is associated with multiple ones of said resource sets.

13. A method of controlling the switching of communication paths in communication equipment using a switching apparatus, the switching apparatus including a switch having a plurality of input/output ports traversed by corresponding selected ones of the communication paths, the switch providing switch resources for interconnecting said selected ones of the communication paths, a divider unit operatively connected to said switch, and a plurality of independent controllers coupled for communication with said switch via said divider unit, each of said controllers being arranged to invoke control operations on the switch, the method comprising the steps of:

dividing some or all of the switching resources into a plurality of switch resource sets;

associating at least some of said switch resource sets with respective ones of said controllers;

checking the invocations made by each of said controllers; and ensuring each of said control operations is able to invoke only such control operations as conform to the resources associated with the respected controller, thereby to control the switching of communication paths on the basis of said least some of said switch resource sets associated with said respective said controllers.

* * * * *